United States Patent
Inarida

(10) Patent No.: US 7,237,492 B2
(45) Date of Patent: Jul. 3, 2007

(54) RAILWAY CAR DRIVE SYSTEM

(75) Inventor: Satoru Inarida, Hitachinaka (JP)

(73) Assignee: Hitachi, Ltd., Tokyo (JP)

(*) Notice: Subject to any disclaimer, the term of this patent is extended or adjusted under 35 U.S.C. 154(b) by 39 days.

(21) Appl. No.: 10/664,963

(22) Filed: Sep. 22, 2003

(65) Prior Publication Data

US 2005/0000386 A1 Jan. 6, 2005

(30) Foreign Application Priority Data

Jul. 3, 2003 (JP) ............................. 2003-191312

(51) Int. Cl.
*B61C 3/00* (2006.01)
*B61C 7/04* (2006.01)

(52) U.S. Cl. ...................................... 105/35

(58) Field of Classification Search ............. 105/26.05, 105/35, 49, 50, 51, 73
See application file for complete search history.

(56) References Cited

U.S. PATENT DOCUMENTS

| 4,702,291 A | 10/1987 | Engle |
| 5,318,142 A * | 6/1994 | Bates et al. ................ 180/65.2 |
| 5,971,092 A * | 10/1999 | Walker ....................... 180/308 |
| 6,441,581 B1 | 8/2002 | King |
| 6,591,758 B2 * | 7/2003 | Kumar ........................ 105/35 |
| 2002/0174798 A1 | 11/2002 | Kumar |

FOREIGN PATENT DOCUMENTS

| DE | 197 18 840 | 11/1997 |
| DE | 100 64 973 | 6/2002 |

\* cited by examiner

*Primary Examiner*—S. Joseph Morano
*Assistant Examiner*—Robert J. McCarry, Jr.
(74) *Attorney, Agent, or Firm*—Antonelli, Terry, Stout and Kraus, LLP.

(57) ABSTRACT

A railway car drive system comprising a first railway car mounting a power generator, a power converter, a driving motor and a power storage; a second railway car mounting a power converter, a driving motor and a power storage; and a power transmission connecting each of the power generators and power storage; wherein the system further comprises a power management unit for controlling the generated power of the power generator and the power storage quantity of the power storage, the power storage storing the power generated by the power generator and a regenerative power, the driving motor being driven via the power converter using as power source the power generator and the power storage to thereby run the train.

4 Claims, 4 Drawing Sheets

RAILWAY CAR DRIVE SYSTEM

FIELD OF THE INVENTION

The present invention relates to a railway car drive system for accelerating and decelerating a train by driving a motor via a power converter using power generated by a power generation means as its power source, and further relates to a railway car drive system that enables to optimize the power generation capacity of the power generation means, to reduce the size and weight of the devices mounted on the railway car, and to improve the power efficiency and reliability of the drive system.

DESCRIPTION OF THE RELATED ART

FIG. 4 shows one example of a system configuration for accelerating and decelerating a train (railway car drive system) using power generated by a power generation means as its power source. The railway car drive system shown in FIG. 4 comprises a first railway car 1 mounting a power generation means 10 for generating the power for driving the train, and plural second railway cars 2 each mounting a power converter 20 that utilizes as its power source the power generated by the power generation means 10 and driving wheels 30 driven by a driving motor not shown controlled through the power converter 20.

In other words, the railway car drive system shown in FIG. 4 disposes the power generation means 10 in a concentrated manner to the first railway car 1, and obtains the driving power at the second railway cars 2 on which passengers board. By disposing the power generation means 10 only on the first railway car 1 on which passengers do not board, and not on the second railway cars 2 on which passengers board, it becomes possible to free the passengers from unpleasant noise and vibration that the power generation means 10 creates, and to provide a pleasant cabin environment for the passengers.

One example of typical train characteristics is shown in FIG. 2. FIG. 2 shows the output characteristics of the train according to which the horizontal axis represents train speed and the vertical axis represents input of the power converter, that is, output power of the driving motor, and the torque of the driving motor. The output power increases as the train speed rises, but when the train reaches a certain speed, the power becomes steady, and when the speed rises further, the power starts to decrease. The torque maintains a fixed value from the start of the train until the train speed reaches a certain speed, but when the train speed exceeds the certain speed, the torque starts to decrease. Such output characteristics are determined by the property of the motor that drives the train, and although the speed at which the power becomes steady or the speed at which the power starts to decrease vary according to the motor, basically the motor generally has the output characteristics shown in FIG. 2.

In order to achieve the train characteristics as shown in FIG. 2 by the railway car drive system illustrated in FIG. 4, the power generation capacity of the power generation means 10 must be set equal to or greater than the maximum power quantity (point A in the drawing).

However, the train is not always accelerated through its maximum power, so it can be said that in average the above-explained conventional drive system is equipped with a power generation means having a capacity larger than necessary, which makes the conventional drive system not the most preferable from the point of view of efficient use of the power generation means.

Furthermore, since the train drive system illustrated in FIG. 4 does not have means for recovering the kinetic energy generated during deceleration, the system requires a mechanical brake that provides sufficiently large braking force, and thus the cost of the railway car increases. Moreover, since the only braking means provided to the system is the mechanical brake, the frequent use of the mechanical brake makes it difficult to cut down the maintenance cost related to the brake, such as the replacement of the brake shoe.

It may be possible to apply a rheostatic brake system in which the regenerative energy obtained during deceleration is consumed as heat, but the application of this system causes other problems, such as the need to provide resistors to the system in addition.

Further, the application of either system does not enable the kinetic energy that is supposedly recovered during deceleration to be utilized effectively. That is, according to the above-mentioned train drive systems, unlike electric trains, the kinetic energy recovered during braking cannot be reutilized as regenerative energy, thus the energy efficiency cannot be improved.

SUMMARY OF THE INVENTION

The object of the present invention is to solve the above-mentioned problems of the prior art. That is, the present invention provides a railway car drive system for accelerating and decelerating a train by operating a driving motor driven via a power converter using power generated through the power generation means as its power source, the system being capable of optimizing the power generation capacity of the power generation means, minimizing the size and weight of the power generation means, regenerating the power generated during braking to improve the power efficiency of the whole drive system, and recovering the regenerative energy infallibly so as to reduce the load borne by the braking system and to thereby improve the safety and reliability of the railway car drive system.

A railway car drive system for accelerating and decelerating a train by operating a driving motor via power converters mounted in a dispersed manner on railway cars constituting the train and using as power source the power generated by a power generation means disposed at least in one car constituting the train, wherein power storage means are further arranged in dispersed manner on the cars constituting the train, and the power (output power) generated by the power generation means and/or the regenerative energy obtained via the driving means is/are stored in the power storage means according to need, and the energy stored in the storage means is supplied to the driving means. Furthermore, the system can comprise a power management means for managing and controlling the power in the power storage means and the output power of the power generation means (and also the power of the driving means if necessary), storing the regenerative energy obtained during deceleration and the output power of the power generation means to the power storage means and accelerating the train using the output power from the power generation means and the power stored in the power storage means.

However, if the storage capacity of the power storage means is not large enough with respect to the power required to run the train, which may be the case if the power capacity of the power storage means is minimized so as to reduce the size and weight of the devices mounted on the cars that constitute the train, it may not be possible to acquire the necessary driving power to accelerate the train. Further, if a large amount of power is already stored in the power storage means and the storage means cannot store (absorb) the regenerative energy, the braking force required for deceleration cannot be obtained through regenerative operation.

Therefore, according to the above-mentioned railway car drive system, a power management means for controlling the power of the power storage means and the generated power at the power generation means is utilized to manage and control the power of these means, so as to realize a state in which both the driving force required for running the train and the braking force realized by regenerative operation can be obtained.

DETAILED DESCRIPTION OF THE PREFERRED EMBODIMENT

Now, one example of a preferred embodiment of the railway car drive system according to the present invention will be explained with reference to FIG. 1.

Figure 1:
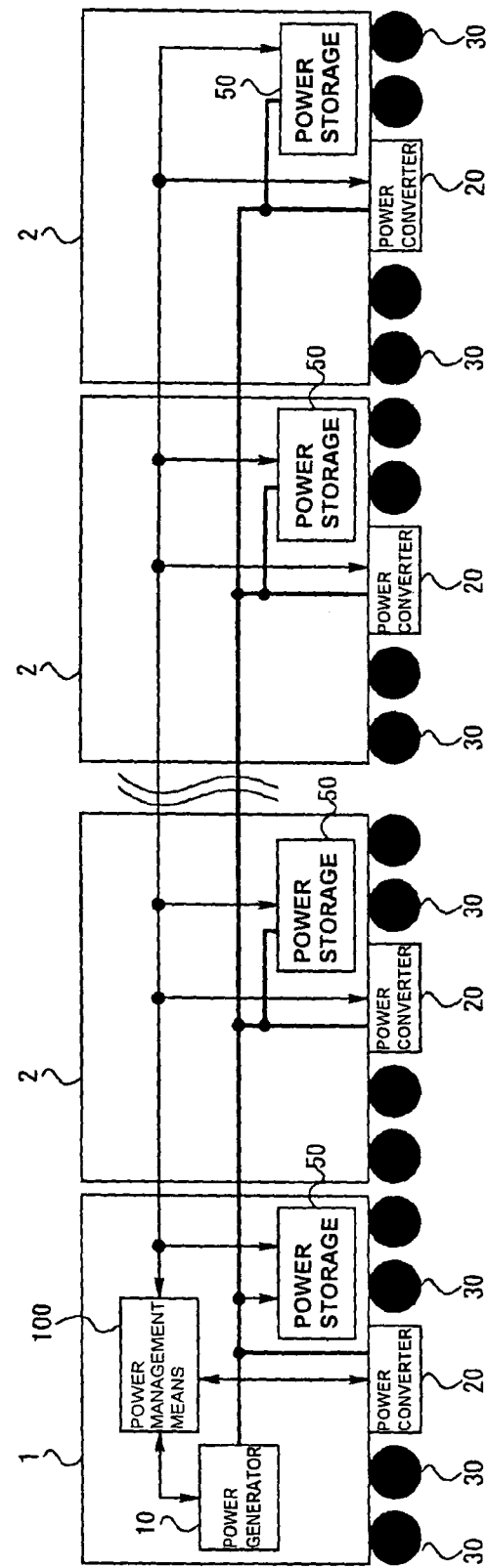
FIG. 1 is an explanatory view showing the configuration of a first embodiment of the railway car drive system according to the present invention.
Figure 2:
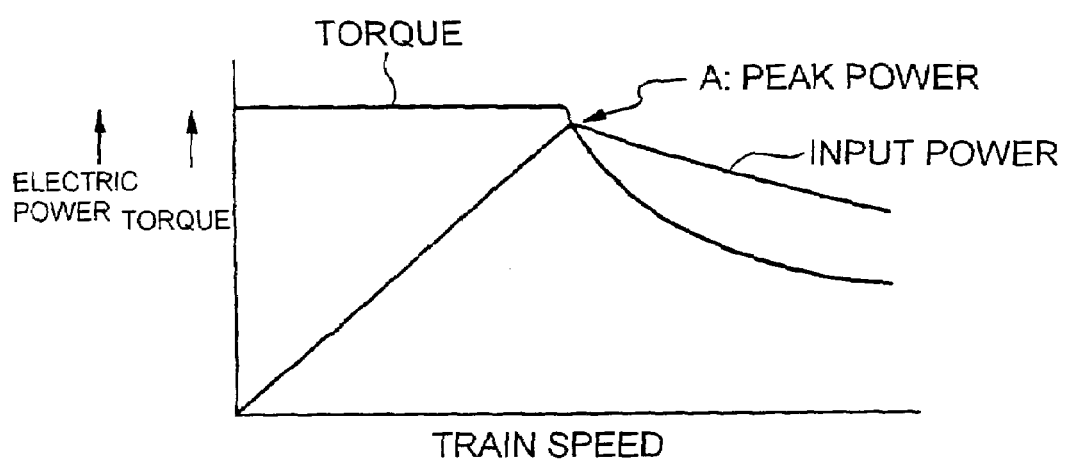
FIG. 2 is an explanatory view showing one example of the output characteristics of the electric motor according to the railway car drive system.

In FIG. 1, the railway car drive system according to the present invention comprises a first railway car 1 mounting a power generation means 10 and a power converting means 20 for controlling a driving motor not shown for driving plural driving wheels 30; a plurality of second railway cars 2, 2, 2 each mounting a power converting means 20 for controlling the driving motor not shown that drive the driving wheels 30 and a power storage means 50; a power transmission means 40 that connect the power generation means 10 with each power converting means 20 and each power storage means 50 for supplying the power generated at the power generation means 10 to each power converting means 20; and a power management means 100 mounted on the first railway car 1 for managing the generated power of the power generation means 10 disposed on the first car 1 and the stored power of the power storage means 50 disposed on each of the railway cars.

We will now explain the operation of the railway car drive system according to the present invention, taking as an example the operation of the train from the stopped state to acceleration, coasting, deceleration and stopping. The power of the power generation means 10 disposed on the first railway car 1 and the power of the power storage means 50 and power converters 20 mounted on the first railway car 1 and the second railway cars 2, respectively, are controlled by the power management means 100.

First, while the train is stopped, the generated power of the power generation means 10 is stored in each of the power storage means 50, so that a portion of the power necessary for acceleration is stored in each of the power storage means 50.

Figure 3:
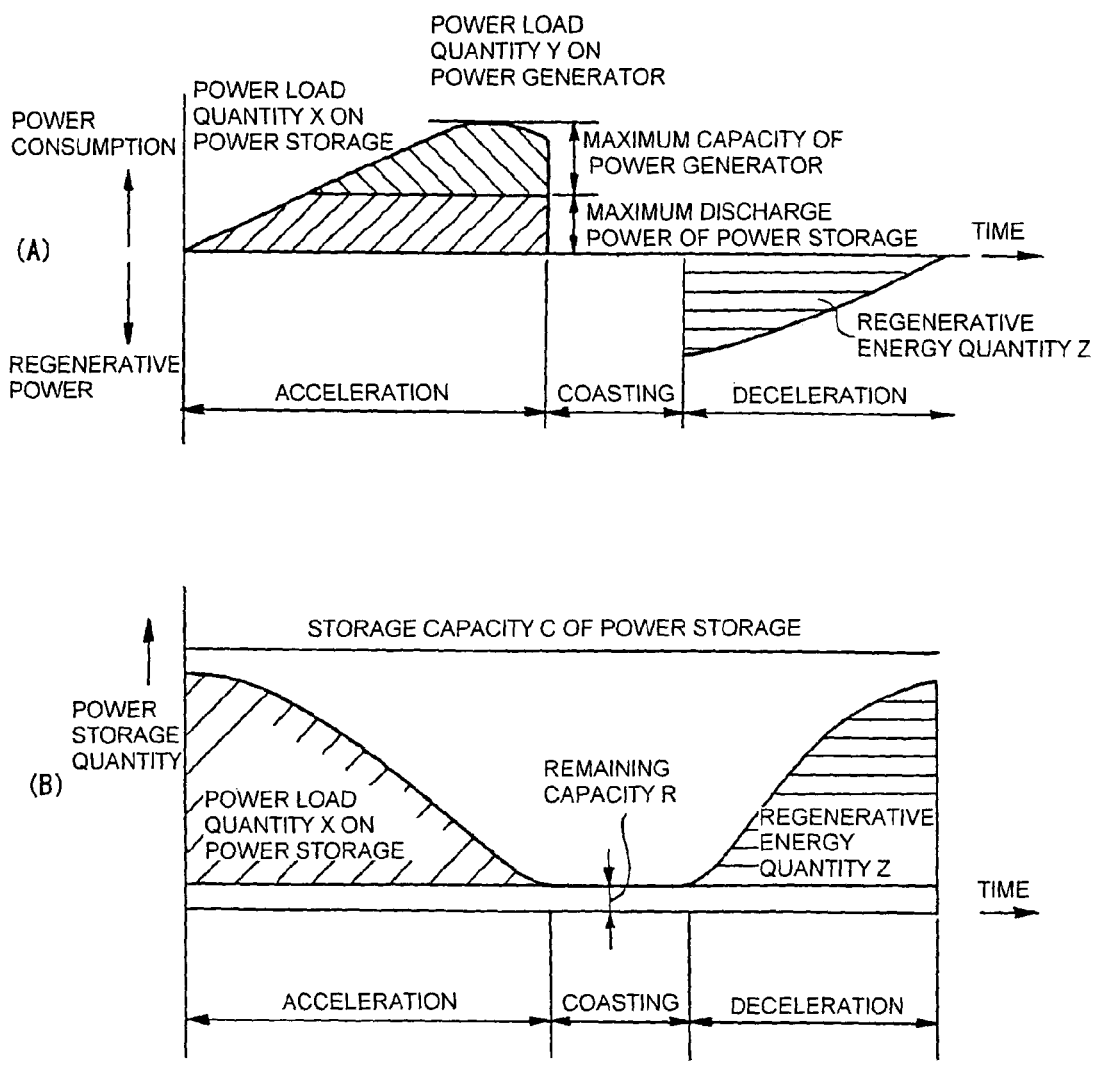
FIG. 3 shows one example of the power consumption of a train according to the present railway car drive system.
Figure 4:
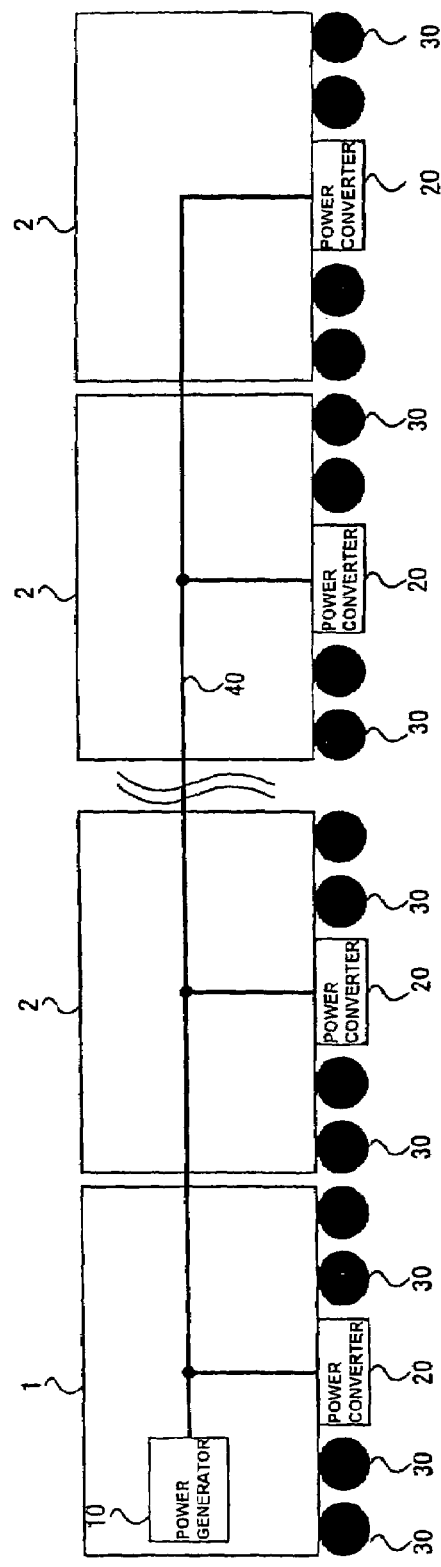
FIG. 4 is an explanatory view showing the configuration of a prior art railway car drive system.

The train formed of the first railway car 1 and plural second railway cars 2, 2, 2 is accelerated by driving a driving motor by the power from the power generation means 10 and plural power storage means 50. In order to equalize (level) the power generated by the power generation means 10, for example, the ratio between the output power from each of the power storage means 50 and the output power of the power generation means 10 is adjusted as shown in FIG. 3(A). In the example of FIG. 3(A), a portion of the driving power is borne by each power storage means 50, so the maximum value of the power generated by the power generation means 10 can be reduced to approximately one-half.

Furthermore, by storing in each power storage means 50 the power generated by the power generation means 10 during coasting so as to minimize the time of operation of the power generation means 10 while the train is stopped, the increase of noise generated by the power generation means 10 when the train is stopped at a station is prevented, and the noise caused near the platform and around the station can be reduced.

During deceleration, the power converter 20 is controlled to operate the driving motor as a power generator and to store the generated power to the power storage means 50, thereby obtaining regenerative braking power. By utilizing the regenerative power stored in the power storage means 50 during regenerative braking as powering force for acceleration, the energy efficiency is improved greatly. Moreover, the load borne by the mechanical brakes is cut down if the train is decelerated using regenerative braking, so the maintenance operations concerning the brake system such as the replacement of the brake shoe can be reduced, and as a result, the running cost can be cut down efficiently.

Next, with reference to FIG. 3(B), the power management method for minimizing the power capacity of the power storage means 50 is explained. If the storage capacity C of the power storage means 50 has sufficient allowance with respect to the power required for running the train, a relatively simple power control will do. However, in order to cut down the weight and size of the equipment on the train, if the storage capacity C of the power storage means 50 is minimal with respect to the power required to run the train, there may be cases in which the stored power in the power storage means 50 is decreased so that sufficient powering force cannot be supplied during acceleration, or in which the regenerative power Z generated by regenerative braking becomes excessive with respect to the storage capacity C so that a portion of the regenerative energy cannot be stored and thus sufficient braking force cannot be obtained.

In order to prevent such problems from occurring, a method for constantly monitoring the amount of power stored in the power storage means 50 and for controlling and adjusting the amount of power stored therein according to the operational status of the train will now be explained with reference to FIG. 3(B).

A train leaving station A and stopping at station B is taken as an example. The amount of power borne by the power storage means 50 during acceleration is denoted as power load quantity X of the power storage means, and the amount of power borne by the power generation means 10 is denoted as power load quantity Y of the power generation means. In this case, the power management means 100 operates the power generation means 10 to store to the power storage means 50 the power load quantity X borne by the power storage means 50 during acceleration before the departure of the train from station A.

On the other hand, in order to absorb the regenerative energy quantity (regenerative power quantity) Z obtained by the regenerative braking from the start of deceleration to the stopping of the train by the power storage means 50, the power (remaining capacity) R remaining in the power storage means 50 at the start of deceleration is controlled so that it satisfies the following equation (1).

Remaining capacity $R$ < Storage capacity $C$ of power storage means − Regenerative energy quantity $Z$     Equation (1)

According to this embodiment, the regenerative braking from the start of deceleration to the stopping of the train can be utilized fully, enabling the regenerative energy to be utilized effectively and the regenerative braking to be applied safely.

Actually, the power load quantity X for the power storage means, the power load quantity Y for the power generation means and the regenerative energy quantity Z are varied according to the conditions of the railway track between stations or the operating conditions of the train, therefore, by considering the most severe conditions assumable for the power storage means 50 and performing power control accordingly, the utilization rate of the power storage means 50 can be enhanced without affecting the train operation, and the energy efficiency can be improved.

Since it becomes possible to apply regenerative braking in a safe and effective manner, the operation frequency of the mechanical brake is minimized, thus the maintenance of the brake system can be minimized. As for the aforementioned track conditions or the operating conditions, the data related to such conditions can be stored in advance in a memory or the like not shown of the power management means, and by referring to these data during system control, the utilization of the power storage means 50 can be optimized and the energy efficiency can be further enhanced.

The above example explained the case in which a single power management means 100 is used to manage all the power generation means 10, the power storage means 50 and the power converter 20 mounted on the whole car formation, but the effects of the above-mentioned example can also be achieved by disposing plural power management means 100 to correspond to the power generation means 10, the power storage means 50 and the power converter 20, respectively, having the plurality of power management means 100 mutually exchanging information regarding the power status of each means in performing power control of the respective means.

A chargeable-dischargeable battery of various types, a capacitor, a flywheel and the like can be applied as the power storage means in the above example.

In the example shown in FIG. 1, there is only one first car included in the car assembly, but the same effects of the present embodiment can be achieved even if there are plural first cars included in the assembly. Furthermore, the assembly of FIG. 1 is composed of a first car and plural second cars, but in addition, a third car mounting only a power storage means (that is, without a power generation means, an electric motor or a power converter) can be connected to the assembly to achieve the same effects.

Further, the power storage means can be mounted only to the first car, or only to the second car(s), or to both. Moreover, the power storage means can be designed to store only the power generated through the power generation means, or only the regenerative power, or both powers. Furthermore, the train is run by operating the driving motor through the power converter, using as its power source either both the power generated from the power generation means and the power discharged from the power storage means, or only the power discharged from the power storage means.

Furthermore, it is possible to dispose the power management means to each of the cars, to thereby control the power generation means, the power converter and the power storage means independently.

As explained, the present invention provides a railway car drive system that realizes the effective use of regenerative energy without disposing resistors, and the cut-down of maintenance operation related to the mechanical brakes. Moreover, since the increase of maximum output capacity of the power generation means can be suppressed according to the invention by supplying necessary power during acceleration from the power storage means, the size and weight of the power generation means can be reduced greatly.

According further to the present invention, by distributing the power storage means to each of the cars, the maximum axle load (calculated by dividing the weight of the heaviest car by the number of axes, being the weight loaded on the railway tracks) is reduced compared to the conventional example in which the power storage means is disposed in a concentrated area, thus the damage provided to the tracks by the train can be minimized, and the maintenance work of the tracks can be cut down. In Europe and other countries that adopt a railway system in which the operation of trains and the management of tracks are performed by different companies, the access charge of the train is determined by axle load, so according advantageously to the present invention that effectively reduces the axle load of the railway car, the access charge can also be reduced.

Furthermore, by dispersing the power storage means to each of the cars constituting the railway car assembly, it becomes possible to use a large number of power storage means of the same model enabling to maintain a large storage capacity, so the maintenance operation becomes facilitated, the redundancy of the system is modified, and the reliability of the railway car is improved advantageously.

What is claimed is:

1. A railway car drive system comprising:
   a first railway car mounting a power generation means, a power converter and a driving motor; and
   at least one second railway car mounting a power converter and a driving motor connected to said power generation means of said first railway car so as to directly use said power generation means of said first railway car as a power source for said at least one second railway car;
   wherein a power storage means is mounted on either said first or said at least one second railway car, or both said first and at least one second railway cars, said power storage means storing both the power generated by said power generation means of said first railway car and a regenerative power obtained during braking of said train, or storing either the power generated by said power generation means of said first railway car or the regenerative power, and driving said driving motor via said power converter using as a power source either both of said power generation means of said first railway car and said power storage means or only said power storage means, to drive a train;
   at least one third railway car mounting power storage means, to thereby increase the capacity of the power storage means of said railway car drive system; and
   a power management means for controlling the power generated by said power generation means of said first railway car and the storage quantity of said power storage means so as to minimize the power capacity of said power generation means of said first railway car, said power management means being disposed in each car so as to control each of said power generation means of said first railway car and said power storage means of a respective car independently.

2. The railway car drive system according to claim 1, wherein said power storage means is a chargeable-dischargeable battery.

3. The railway car drive system according to claim 1, wherein said power storage means is a capacitor or a flywheel.

4. The railway car drive system according to claim 1, wherein said power converter of said at least one second railway car receives power for driving said driving motor thereof directly from said power generation means of said first railway car as the power source thereof.

\* \* \* \* \*